United States Patent
Huh (10) Patent No.: US 8,605,906 B2
(45) Date of Patent: Dec. 10, 2013

(54) BLUETOOTH® DEVICE AND METHOD OF CONNECTING BLUETOOTH® DEVICES USING A BLUETOOTH® CHANNEL

(75) Inventor: Mi Suk Huh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 13/116,674

(22) Filed: May 26, 2011

(65) Prior Publication Data

US 2012/0063598 A1 Mar. 15, 2012

(30) Foreign Application Priority Data

Sep. 10, 2010 (KR) .................. 10-2010-0089001

(51) Int. Cl.
*H04L 29/06* (2006.01)
*H04L 9/32* (2006.01)

(52) U.S. Cl.
USPC ......................... 380/270; 713/171

(58) Field of Classification Search
None
See application file for complete search history.

(56) References Cited

U.S. PATENT DOCUMENTS

| | | | |
|---|---|---|---|
| 5,930,479 A * | 7/1999 | Hall | 709/238 |
| 2006/0013396 A1* | 1/2006 | Kollmitzer | 380/256 |
| 2008/0080703 A1* | 4/2008 | Penning et al. | 379/428.02 |
| 2008/0134281 A1 | 6/2008 | Shinde et al. | |
| 2009/0061822 A1 | 3/2009 | Govindachari et al. | |
| 2009/0228707 A1* | 9/2009 | Linsky | 713/171 |

FOREIGN PATENT DOCUMENTS

| KR | 10-2006-0071907 | 6/2006 |
|---|---|---|
| KR | 10-2007-0096488 | 10/2007 |

* cited by examiner

*Primary Examiner* — Gilberto Barron, Jr.
*Assistant Examiner* — Malcolm Cribbs
(74) *Attorney, Agent, or Firm* — NSIP Law (57) ABSTRACT

Provided are a method of connecting BLUETOOTH® devices using a single BLUETOOTH® channel and a BLUETOOTH® device using the method. A public key may be exchanged via a predefined single BLUETOOTH® channel, thereby preventing a Man-in-the-middle (MITM) attack. For example, when an MITM attacker intercepts the public key and attempts to perform an attack on the other BLUETOOTH® devices, other BLUETOOTH® devices may also receive the public key via the single BLUETOOTH® channel. Accordingly, the other BLUETOOTH® devices may recognize that the MITM attacker attempts to carry out the MITM attack using a disguised address.

23 Claims, 4 Drawing Sheets

BLUETOOTH® DEVICE AND METHOD OF CONNECTING BLUETOOTH® DEVICES USING A BLUETOOTH® CHANNEL

CROSS-REFERENCE TO RELATED APPLICATION(S)

This application claims the benefit under 35 U.S.C. §119 (a) of Korean Patent Application No. 10-2010-0089001, filed on Sep. 10, 2010, in the Korean Intellectual Property Office, the entire disclosure of which is incorporated herein by reference for all purposes.

BACKGROUND

1. Field

The following description relates to a method of connecting BLUETOOTH® devices for BLUETOOTH® communication.

2. Description of Related Art

Before communication between BLUETOOTH® devices is performed, the BLUETOOTH® devices may connect to each other. For example, during a connection process a BLUETOOTH® device may determine whether a public key is properly exchanged, or whether there has been an attack such as a Man-in-the-middle (MITM) attack. For example, a BLUETOOTH® device that can use an Out of Band (OOB) channel may determine whether the public key is properly exchanged using the OOB channel.

However, for a BLUETOOTH® device that does not include a display apparatus and a keyboard, such as a headphone, when the OOB channel is not utilized, the process may proceed without determining whether the public key is properly exchanged. In this example, the BLUETOOTH® device may be easily exposed to the MITM attack.

Also, another interface, for example, an Infrared Data Association (IrDA) may use the OOB channel, thereby causing an increase in manufacturing costs.

SUMMARY

In one general aspect, there is provided a connection method of a first BLUETOOTH® device for a BLUETOOTH® communication between the first BLUETOOTH® device and a second BLUETOOTH® device, the connection method including transmitting a public key of the first BLUETOOTH® device to the second BLUETOOTH® device via a predefined single BLUETOOTH® channel, determining whether a response to the public key of the first BLUETOOTH® device is transmitted from at least two BLUETOOTH® devices, and releasing a connection with other BLUETOOTH® devices including the second BLUETOOTH® device upon determining that a response was transmitted from at least two BLUETOOTH® devices.

The transmitting of the public key of the first BLUETOOTH® device may further comprise transmitting an address of the first BLUETOOTH® device together with the public key of the first BLUETOOTH® device.

The determining may comprise determining whether the response to the public key of the first BLUETOOTH® device is transmitted from the at least two BLUETOOTH® devices based on whether interference occurs in the response to the public key of the first BLUETOOTH® device.

The determining may comprise receiving the response to the public key of the first BLUETOOTH® device via the predefined single BLUETOOTH® channel.

If the response to the public key of the first BLUETOOTH® device is determined to be transmitted from a single BLUETOOTH® device, the connection method may further comprise obtaining the public key of the single BLUETOOTH® device from the single BLUETOOTH® device, and transmitting, to the single BLUETOOTH® device, a response to the public key of the single BLUETOOTH® device.

The transmitting of the response to the public key of the single BLUETOOTH® device may further comprise transmitting the response to the public key of the single BLUETOOTH® device via the predefined single BLUETOOTH® channel.

The connection method may further comprise selecting one of a multi-channel mode for sequentially transmitting the public key of the first BLUETOOTH® device using a plurality of available BLUETOOTH® channels, and a One Channel Mode (OCM) for transmitting the public key of the first BLUETOOTH® device via the predefined BLUETOOTH® channel from among the plurality of available BLUETOOTH® channels, wherein the transmitting further comprises transmitting the public key of the first BLUETOOTH® device to the second BLUETOOTH® device via the predefined single BLUETOOTH® channel when the OCM is selected.

The connection method may further comprise transmitting synchronization information of the first BLUETOOTH® device or receiving synchronization information of the second BLUETOOTH® device.

In another aspect, there is provided a connection method of a second BLUETOOTH® device for a BLUETOOTH® communication between the first BLUETOOTH® device and the second BLUETOOTH® device, the connection method including receiving a public key of the first BLUETOOTH® device from the first BLUETOOTH® device via a predefined single BLUETOOTH® channel, transmitting a response to the public key of the first BLUETOOTH® device to the first BLUETOOTH® device, transmitting a public key of the second BLUETOOTH® device to the first BLUETOOTH® device, and releasing a connection with other BLUETOOTH® devices including the first BLUETOOTH® device, in response to determining that a response to the public key of the second BLUETOOTH® device is transmitted from the first BLUETOOTH® device and at least one other device.

The first BLUETOOTH® device may determine whether the response to the public key of the first BLUETOOTH® device is transmitted from at least two BLUETOOTH® devices, and may determine whether to transmit the response to the public key of the second BLUETOOTH® device to the second BLUETOOTH® device based on the determined result.

The releasing may comprise releasing the connection with the other BLUETOOTH® devices including the first BLUETOOTH® device, in response to determining that the response to the public key of the second BLUETOOTH® device is not received for a predetermined period of time.

The releasing may comprise releasing the connection with the other BLUETOOTH® devices including the first BLUETOOTH® device based on whether interference occurs in the response to the public key of the second BLUETOOTH® device.

In another aspect, there is provided a first BLUETOOTH® device that performs a connection for a BLUETOOTH® communication between the first BLUETOOTH® device and a second BLUETOOTH® device, the first BLUETOOTH® device including a transmission unit to transmit a public key of the first BLUETOOTH® device to the second BLUETOOTH® device via a predefined single BLUETOOTH® channel, a determination unit to determine whether a response to the public key of the first BLUETOOTH® device is transmitted from at least two BLUETOOTH® devices, and a releasing unit to release a connection with other BLUETOOTH® devices including the second BLUETOOTH® device, if the determination unit determines a response was received from at least two BLUETOOTH® devices.

The transmission unit may further transmit an address of the first BLUETOOTH® device together with the public key of the first BLUETOOTH® device.

The determination unit may determine whether the response to the public key of the first BLUETOOTH® device is transmitted from the at least two BLUETOOTH® devices based on whether interference occurs in the response to the public key of the first BLUETOOTH® device.

The first BLUETOOTH® device may further comprise a receiving unit to receive the response to the public key of the first BLUETOOTH® device via the predefined single BLUETOOTH® channel.

The first BLUETOOTH® device may further comprise a mode determination unit to select one of a multi-channel mode for sequentially transmitting the public key of the first BLUETOOTH® device using a plurality of available BLUETOOTH® channels, and an OCM for transmitting the public key of the first BLUETOOTH® device via the predefined single BLUETOOTH® channel from among the plurality of available BLUETOOTH® channels, wherein the transmission unit transmits the public key of the first BLUETOOTH® device to the second BLUETOOTH® device via the predefined single BLUETOOTH® channel when the mode determination unit selects the OCM.

If the response to the public key of the first BLUETOOTH® device is determined to be transmitted from a single BLUETOOTH® device, the transmission unit may transmit the response to the public key of the single BLUETOOTH® device to the single BLUETOOTH® device.

The transmission unit may transmit the response to the public key of the single BLUETOOTH® device to the single BLUETOOTH® device via the predefined single BLUETOOTH® channel.

In another aspect, there is provided a BLUETOOTH® device for detecting a transmission attack, the BLUETOOTH® device including a transmission unit to transmit a public key of the BLUETOOTH® device to another BLUETOOTH® device via a predefined single BLUETOOTH® channel to establish a connection with the other BLUETOOTH® device, and a releasing unit to release the connection with the other BLUETOOTH® device, if the BLUETOOTH® device determines a response was received from at least two other BLUETOOTH® devices.

The BLUETOOTH® device may further comprise a determination unit to determine whether a response to the public key of the BLUETOOTH® device is received from at least two other BLUETOOTH® devices.

The determination unit may determine that the response is received from at least two other BLUETOOTH® devices when no response is received over a predetermined amount of time.

The determination unit may determine that the response is received from at least two other BLUETOOTH® devices when the BLUETOOTH® device receives a first response from the other BLUETOOTH® device and also receives a second response from another BLUETOOTH® device.

The BLUETOOTH® device may further comprise a mode determination unit to select either a multi-channel mode for sequentially transmitting the public key of the BLUETOOTH® device via a plurality of available BLUETOOTH® channels, and a One Channel Mode (OCM) for transmitting the public key of the BLUETOOTH® device via the predefined single BLUETOOTH® channel from among the plurality of available BLUETOOTH® channels.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

In a connection process between BLUETOOTH® devices, the BLUETOOTH® devices may exchange a public key. The public key may be used for the purpose of a Simple Secure Pairing (SSP). To verify whether the public key is correctly exchanged various method may be formed. Some examples of the methods include a method of a numeric comparison for a BLUETOOTH® device that has a display apparatus, a method of omitting an authentication process for a BLUETOOTH® device without a display apparatus, a method of using an Out of Band (OOB) channel, a method of inputting a pass key, and the like.

Figure 1:
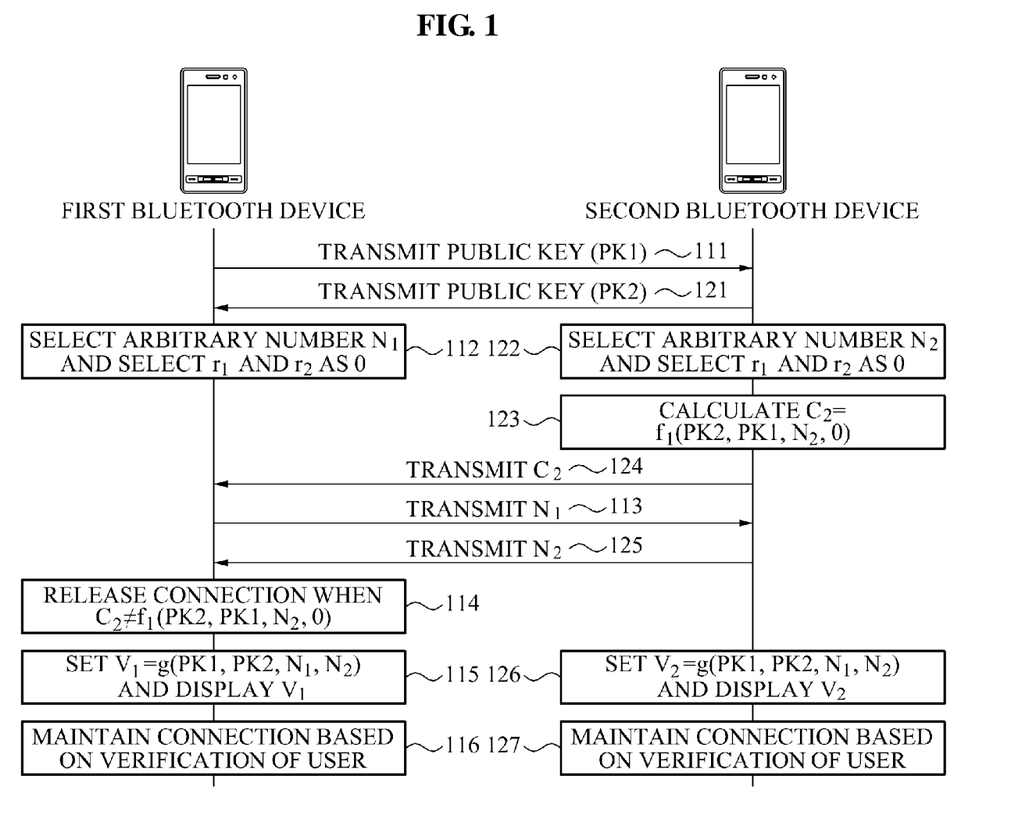
FIG. 1 is a diagram illustrating an example of a process of authenticating a public key using a numeric comparison.

FIG. 1 illustrates an example of a process of authenticating a public key using a numeric comparison. In this example, the BLUETOOTH® devices include a display.

Referring to FIG. 1, in 111, a first BLUETOOTH® device transmits a public key (PK1) of the first BLUETOOTH® device to a second BLUETOOTH® device, and in 121, the second BLUETOOTH® device transmits a public key (PK2) of the second BLUETOOTH® device to the first BLUETOOTH® device.

In 112, the first BLUETOOTH® device selects an arbitrary number $N_1$, and sets $r_1$ and $r_2$ as 0. In 122, the second BLUETOOTH® device selects an arbitrary number $N_2$, and sets $r_1$ and $r_2$ as 0.

In 123, the second BLUETOOTH® device calculates $C_2$. For example, $C_2=f(PK2, PK1, N_2, 0)$ may be satisfied. Also in this example, f(a, b, c, d) may correspond to a predetermined function. In 124, the second BLUETOOTH® device transmits $C_2$ to the first BLUETOOTH® device.

In 113, the first BLUETOOTH® device transmits $N_1$ to the second BLUETOOTH® device. In 125, the second BLUETOOTH® device transmits $N_2$ to the first BLUETOOTH® device.

In this example, the first BLUETOOTH® device may calculate $f(PK2, PK1, N_2, 0)$, and may determine whether the calculated $f(PK2, PK1, N_2, 0)$ is the same as $C_2$ received from the second BLUETOOTH® device. If $C_2$ received from the second BLUETOOTH® device is different from $f(PK2, PK1, N_2, 0)$, the first BLUETOOTH® device releases a connection with the second BLUETOOTH® device, in 114.

If $C_2$ received from the second BLUETOOTH® device is the same as $f(PK2, PK1, N_2, 0)$, in 115 the first BLUETOOTH® device sets $V_1$ as $g(PK1, PK2, N_1, N_2)$. In this example, $g(a, b, c, d)$ may correspond to a predetermined function. In addition, in 115, the first BLUETOOTH® device displays $V_1$.

In 126, the second BLUETOOTH® device sets $V_2=g(PK1, PK2, N_1, N_2)$, and display $V_2$. As an example, $V_1$ and $V_2$ may be a six-digit number.

In this example, $V_1$ and $V_2$ may be displayed in a display apparatus of the first BLUETOOTH® device and a display apparatus of the second BLUETOOTH® device, respectively, and may be compared by a user of each of the devices. If $V_1=V_2$ is satisfied, a public key between the first BLUETOOTH® device and the second BLUETOOTH® device is correctly exchanged. Accordingly, whether the public key is correctly exchanged based on the comparison between $V_1$ and $V_2$ may be verified by the user, and the next operation may proceed.

When $V_1 \neq V_2$ is satisfied, the public key is not correctly exchanged. As an example, the public key may not be correctly exchanged because a Man-in-the-middle (MITM) attack occurs during the exchanging process of the public key between the first BLUETOOTH® device and the second BLUETOOTH® device. For example, if an MITM attacker intercepts the public key of the second BLUETOOTH® device, the first BLUETOOTH® device may obtain a public key (PK3) of the MITM attacker instead of PK2. Accordingly, $V_1=g(PK1, PK3, N_1, N_2)$ would not be satisfied, because $V_1$ would be different from $V_2$ calculated by the first BLUETOOTH® device.

Similarly, if the MITM attacker intercepts the public key of the first BLUETOOTH® device, $V_2=g(PK3, PK2, N_1, N_2)$ would not be satisfied, because $V_1$ would be different from $V_2$ calculated by the second BLUETOOTH® device.

In this example, $V_1$ and $V_2$ may be compared by the user, thereby verifying whether the MITM attack occurs.

In the case of the BLUETOOTH® device that does not include a display apparatus, the above described authentication process of exchanging the public key may not be performed. Accordingly, the BLUETOOTH® device may be easily exposed to the MITM attack.

The BLUETOOTH® device using the OOB channel may perform authentication of the public key using the OOB channel. The authentication of the public key may be performed using the OOB channel so that at least one of the two BLUETOOTH® devices may verify that contents are changed or interference occurs during the exchanging process of the public key due to characteristics of the OOB.

Also, the BLUETOOTH® device having a keyboard may perform the authentication of the public key using an input of a pass key.

Consequently, in the case of the BLUETOOTH® device without the display apparatus or the keyboard such as a headphone, an access point, a main frame of a Personal Computer (PC), a speaker, and the like, if the OOB channel is not used, the authentication process of the public key is omitted. In this example, the BLUETOOTH® device may be easily exposed to the MITM attack due to, for example, a channel hopping scheme of the BLUETOOTH®. However, to use the OOB channel, other interfaces, for example, Infrared Data Association (IrDA), capable of using the OOB channel other than the BLUETOOTH® may exist, thereby causing an increase in manufacturing costs of the BLUETOOTH® device.

As described in various aspects, to safely exchange the public key and to prevent a MITM attack the BLUETOOTH® devices may exchange the public key using a predefined single BLUETOOTH® channel. As another example, the BLUETOOTH® devices may enable a communication distance to be shortened using less power, thereby preventing the MITM attacker from intercepting the exchange of the public key.

Figure 2:
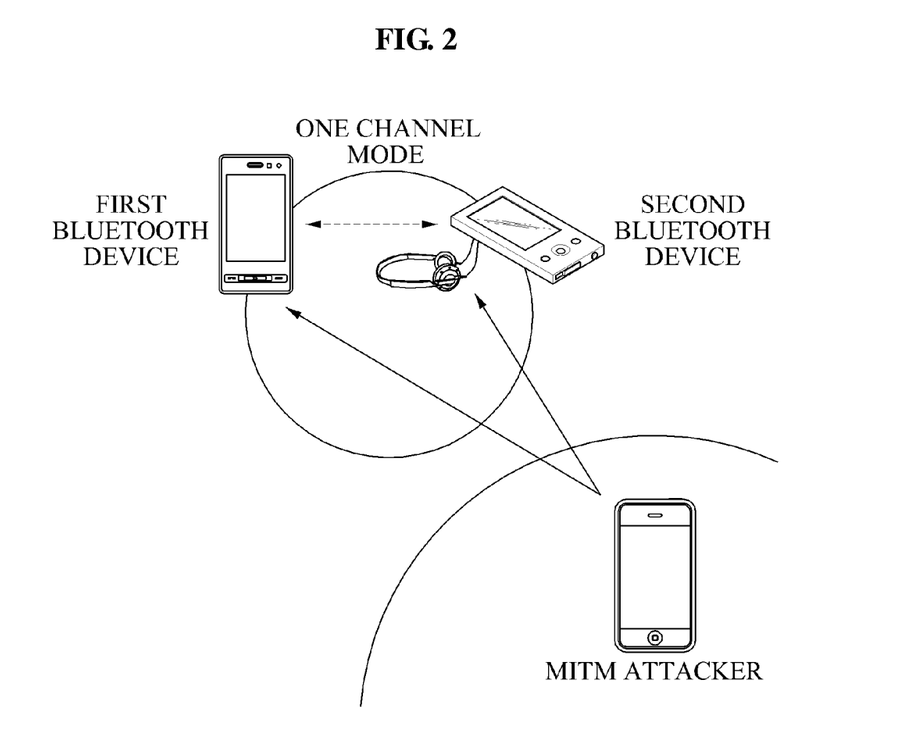
FIG. 2 is a diagram illustrating an example in which a Man-in-the-middle (MITM) attacker attempts to attack BLUETOOTH® devices that exchange a public key.

FIG. 2 illustrates an example in which an MITM attacker attempts to attack BLUETOOTH® devices that exchange a public key.

Referring to FIG. 2, an MITM attacker and first and second BLUETOOTH® devices which are target devices of the MITM attacker are illustrated. The first BLUETOOTH® device and the second BLUETOOTH® device may exchange a public key using a predefined single BLUETOOTH® channel to prevent an MITM attack from being carried out. A mode for exchanging the public key using the single BLUETOOTH® channel may be referred to as One Channel Mode (OCM).

Even though the first BLUETOOTH® device and the second BLUETOOTH® device exchange the public key in the OCM, a BLUETOOTH® communication may use a Time Division Multiple Access (TDMA) scheme. As a result, temporal separation may exist in a transmitting process and a receiving process. Accordingly, a single BLUETOOTH® device may not simultaneously receive other signals while transmitting signals.

In this example, a case in which the MITM attacker intercepts a communication between the first BLUETOOTH® device and the second BLUETOOTH® device, and changes the public key of the first BLUETOOTH® device into a public key of the MITM attacker, to thereby transmit the public key of the MITM attacker to the second BLUETOOTH® device, is considered.

For example, the MITM attacker may interrupt a signal-exchange between the first BLUETOOTH® device and the second BLUETOOTH® device using interference. The MITM attacker may transmit the public key of the MITM attacker while the first BLUETOOTH® device and the second BLUETOOTH® device stand by. However, to carry out the MITM attack, the MITM attacker must obtain information about a public key of a target device.

In an example using the single BLUETOOTH® channel, when the MITM attacker receives the public key from the first BLUETOOTH® device, the second BLUETOOTH® device also receives the public key of the first BLUETOOTH® device. In this example, if the MITM attacker attempts to use a disguised address, the disguised address may be recognized by the second BLUETOOTH® device. Accordingly, the BLUETOOTH® devices may exchange the public key using the single BLUETOOTH® channel, thereby preventing the MITM attack from being carried out.

As another example, the first BLUETOOTH® device and the second BLUETOOTH® device may shorten a distance between the first BLUETOOTH® device and the second BLUETOOTH® device thereby using less power for transmitting the public key. By shortening the distance between the BLUETOOTH® devices, this may further prevent the MITM attacker from intercepting the exchanging of the public key between the first BLUETOOTH® device and the second BLUETOOTH® device.

Figure 3:
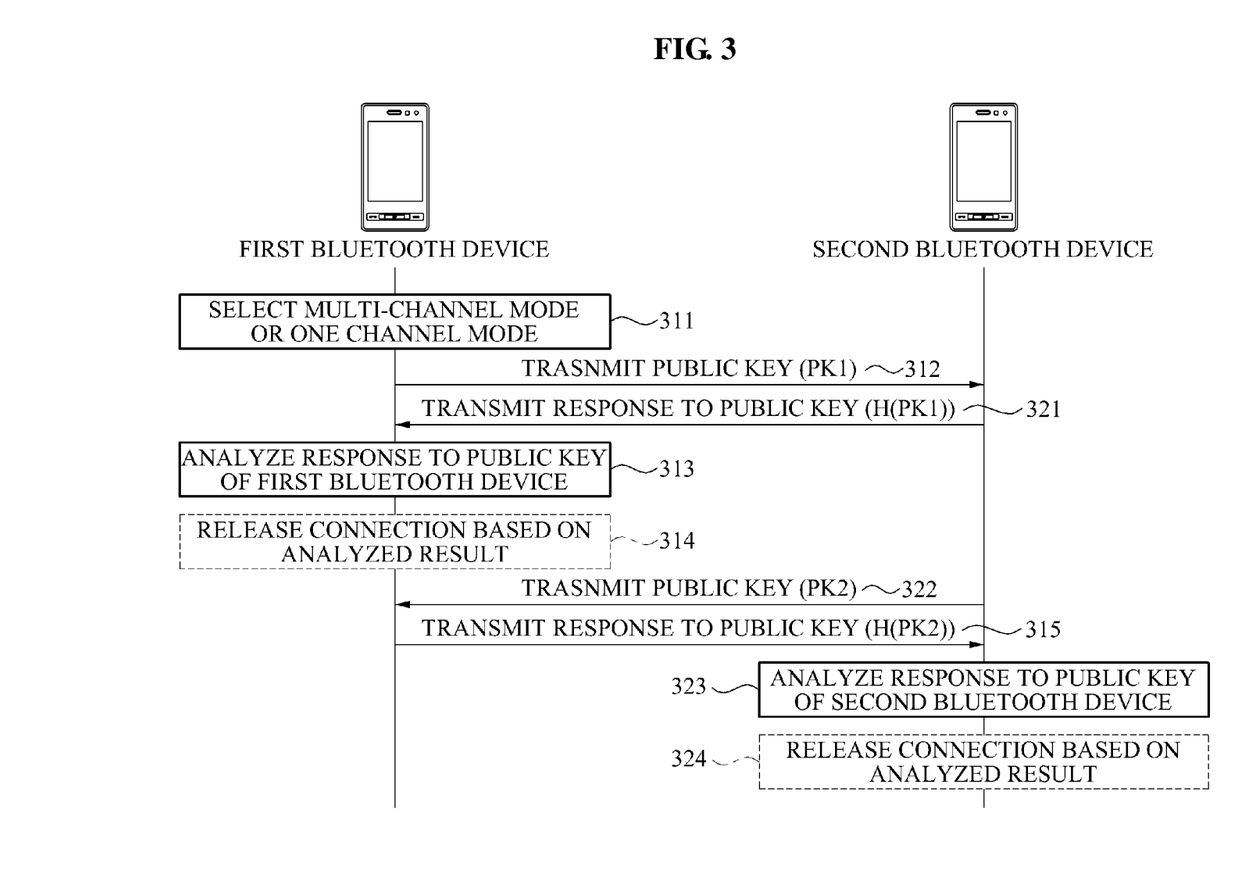
FIG. 3 is a diagram illustrating an example in which a first BLUETOOTH® device and a second BLUETOOTH® device exchange a public key using a single BLUETOOTH® channel.

FIG. 3 illustrates a method in which a first BLUETOOTH® device and a second BLUETOOTH® device exchange a public key using a single BLUETOOTH® channel.

Referring to FIG. 3, in 311, the first BLUETOOTH® device selects a mode for transmitting a public key. For example, the first BLUETOOTH® device may select a multi-channel mode for sequentially transmitting a public key of the first BLUETOOTH® device using a plurality of available BLUETOOTH® channels, or a One Channel Mode (OCM) for transmitting the public key of the first BLUETOOTH® device via the predefined BLUETOOTH® channel from among the plurality of available BLUETOOTH® channels. In this example, both the first BLUETOOTH® device and the second BLUETOOTH® device may be aware of the predefined single BLUETOOTH® channel.

For example, the first BLUETOOTH® device may report a result of the mode selection to the second BLUETOOTH® device, and may receive a response from the second BLUETOOTH® device. An address of the first BLUETOOTH® device may be transmitted together with the result of the mode selection.

During the exchanging process of the public key and the authentication process of the public key, signals between the first BLUETOOTH® device and the second BLUETOOTH® device may be transmitted using the single BLUETOOTH® channel. Also, each time signals are transmitted to the second BLUETOOTH® device, the first BLUETOOTH® device may transmit the address of the first BLUETOOTH® device together with the signal. Also, each time signals are transmitted to the first BLUETOOTH® device, the second BLUETOOTH® device may transmit an address of the second BLUETOOTH® device together with the signal.

In 312, the first BLUETOOTH® device transmits a public key (PK1) of the first BLUETOOTH® device to the second BLUETOOTH® device via the predefined single BLUETOOTH® channel. In addition, the address of the first BLUETOOTH® device may be transmitted together with PK1.

In 321, the second BLUETOOTH® device transmits a response (H(PK1)) to the public key of the first BLUETOOTH® device to the first BLUETOOTH® device via the predefined single BLUETOOTH® channel. For example, the second BLUETOOTH® device may transmit, to the first BLUETOOTH® device, a hash value with respect to the public key of the first BLUETOOTH® device. In addition, the address of the second BLUETOOTH® device may be transmitted together with H(PK1).

The first BLUETOOTH® device may receive the response to the public key of the first BLUETOOTH® device via the predefined single BLUETOOTH® channel. In 313, the first BLUETOOTH® device analyzes the response to the public key of the first BLUETOOTH® device. For example, the first BLUETOOTH® device may determine whether the response to the public key of the first BLUETOOTH® device is transmitted from at least two BLUETOOTH® devices.

This determination may be performed to determine whether interference has occurred in the response to the public key of the first BLUETOOTH® device. For example, if the second BLUETOOTH® device transmits H(PK1) to the first BLUETOOTH® device, and the MITM attacker transmits the response to the public key of the first BLUETOOTH® device to the first BLUETOOTH® device, interference may occur on a receiving unit of the first BLUETOOTH® device.

Accordingly, the first BLUETOOTH® device may not obtain H(PK1) transmitted by the second BLUETOOTH® device due to the interference. In this example, when the first BLUETOOTH® device does not obtain the response to the public key of the first BLUETOOTH® device due to the interference, the first BLUETOOTH® device may determine that the response to the public key of the first BLUETOOTH® device was not received because it was transmitted from at least two BLUETOOTH® devices.

If the response to the public key of the first BLUETOOTH® device is determined to be transmitted from at least two BLUETOOTH® devices, the first BLUETOOTH® device releases a connection with other BLUETOOTH® devices including the second BLUETOOTH® device in order to avoid the MITM attack, in 314.

In 322, the second BLUETOOTH® device transmits a public key (PK2) of the second BLUETOOTH® device to the first BLUETOOTH® device via the predefined single BLUETOOTH® channel.

If the response to the public key of the first BLUETOOTH® device is determined to be transmitted from a single BLUETOOTH® device, the first BLUETOOTH® device may obtain the public key (PK2) of the second BLUETOOTH® device from the second BLUETOOTH® device.

In 315, the first BLUETOOTH® device transmits, to the second BLUETOOTH® device, a response to the public key of the second BLUETOOTH® device. The transmission may be performed using the predefined single BLUETOOTH® channel.

In addition, the first BLUETOOTH® device may transmit synchronization information to the second BLUETOOTH® device. As another example, the second BLUETOOTH® device may transmit the synchronization information to the first BLUETOOTH® device. For example, the synchronization information may be transmitted together with other information such as the public key.

The second BLUETOOTH® device may receive the response to the public key of the second BLUETOOTH® device via the predefined single BLUETOOTH® channel. In 323, the second BLUETOOTH® device analyzes the response to the public key of the second BLUETOOTH® device. For example, the second BLUETOOTH® device may determine whether the response to the public key of the second BLUETOOTH® device is received from the first BLUETOOTH® device.

This determination may be performed to determine whether interference occurs on the response to the public key of the second BLUETOOTH® device. For example, if the first BLUETOOTH® device transmits H(PK2) to the second BLUETOOTH® device, and the MITM attacker transmits the response to the public key of the second BLUETOOTH®device to the second BLUETOOTH® device, interference may occur at a receiving unit of the second BLUETOOTH® device.

Accordingly, the second BLUETOOTH® device may not receive the response to the public key of the second BLUETOOTH® device transmitted by the first BLUETOOTH® device as a result of the interference. In this example, if the second BLUETOOTH® device does not receive the response to the public key of the first BLUETOOTH® device due to the interference, the second BLUETOOTH® device may determine that the response to the public key of the second BLUETOOTH® device is not transmitted from the first BLUETOOTH® device.

For example, if the response to the public key of the second BLUETOOTH® device is not received for the predetermined period of time after the public key (PK2) of the second BLUETOOTH® device is transmitted, the second BLUETOOTH® device may determine that the response to the public key of the second BLUETOOTH® device is not transmitted from the first BLUETOOTH® device.

If the response to the public key of the second BLUETOOTH® device is not received from the first BLUETOOTH® device or it is determined that the response is not received from the first BLUETOOTH® device, the second BLUETOOTH® device may release a connection with other BLUETOOTH® devices including the first BLUETOOTH® device in order to avoid the MITM attack, in 324.

As another example, if the response to the public key of the second BLUETOOTH® device is determined to be transmitted from the first BLUETOOTH® device, an authentication process of the public key may be completed. Then, the first BLUETOOTH® device and the second BLUETOOTH® device may transmit data using the exchanged public keys.

When desiring to replace the public key with a new public key, the first BLUETOOTH® device may perform a signature using an existing public key, and transmit the new public key to the second BLUETOOTH® device. The replacing process of the public key may be performed in the same manner as that of the second BLUETOOTH® device.

In various aspects, the MITM attack on the BLUETOOTH® device such as a headset without the display apparatus and the keyboard may be prevented. Also, when exchanging the public key using the OCM, a plurality of BLUETOOTH® devices may prevent occurrence of the interference using a protocol to appropriately adjust a timing of the response.

As another example, if a predetermined BLUETOOTH® device desires to perform pairing with a BLUETOOTH® device located in front of the predetermined BLUETOOTH® device without searching for other BLUETOOTH® devices, the predetermined BLUETOOTH® device may shorten a communication distance by adjusting power, and may be directly connected to a corresponding BLUETOOTH® device using the OCM.

Figure 4:
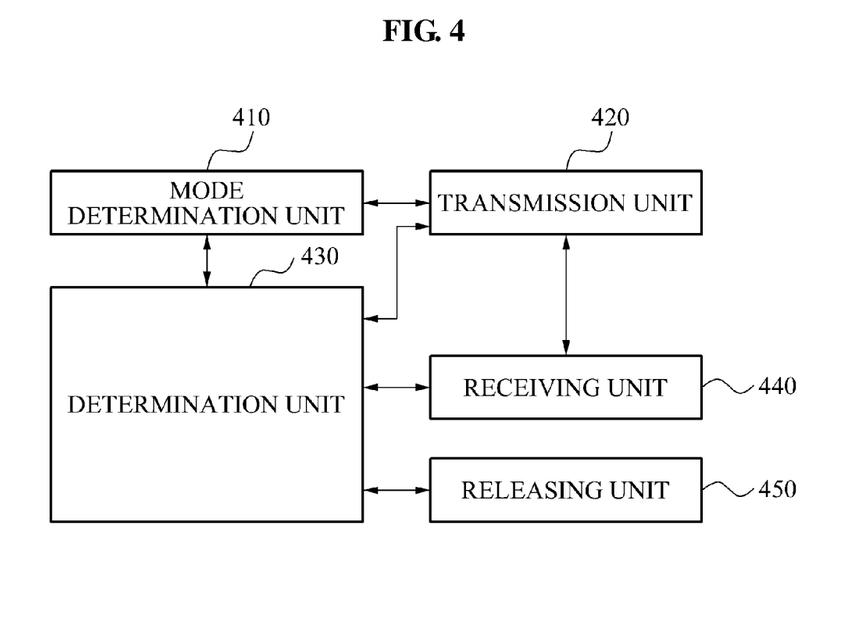
FIG. 4 is a diagram illustrating an example of a BLUETOOTH® device.

FIG. 4 illustrates an example of a first BLUETOOTH® device.

Referring to FIG. 4, the first BLUETOOTH® device includes a mode determination unit 410, a transmission unit 420, a determination unit 430, a receiving unit 440, and a releasing unit 450.

The mode determination unit 410 may select any one of a multi-channel mode for sequentially transmitting the public key of the first BLUETOOTH® device using a plurality of available BLUETOOTH® channels, or an OCM for transmitting the public key of the first BLUETOOTH® device via a predefined single BLUETOOTH® channel from among the plurality of available BLUETOOTH® channels.

The transmission unit 420 may transmit the public key of the first BLUETOOTH® device to the second BLUETOOTH® device via the predefined single BLUETOOTH® channel, when the mode determination unit selects the OCM. The transmission unit 420 may transmit an address of the first BLUETOOTH® device together with the public key of the first BLUETOOTH® device. Also, the transmission unit 420 may transmit a response to a public key of the second BLUETOOTH® device, to the second BLUETOOTH® device, using the predefined single BLUETOOTH® channel.

The determination unit 430 may determine whether a response to the public key of the first BLUETOOTH® device is transmitted from at least two BLUETOOTH® devices. The determination unit 430 may determine whether the response to the public key of the first BLUETOOTH® device is transmitted from at least two BLUETOOTH® devices based on whether interference occurs in the response to the public key of the first BLUETOOTH® device.

The receiving unit 440 may receive the response to the public key of the first BLUETOOTH® device via the predefined single BLUETOOTH® channel. When the determination unit 430 determines that the response to the public key of the first BLUETOOTH® device is transmitted from a single BLUETOOTH® device, the receiving unit 440 may obtain a public key of the single BLUETOOTH® device from the single BLUETOOTH® device. In this example, the single BLUETOOTH® device may indicate the second BLUETOOTH® device.

The releasing unit 450 may release a connection with other BLUETOOTH® devices including the second BLUETOOTH® device based on the determined result. For example, if the determination unit 430 determines that the response to the public key of the first BLUETOOTH® device is transmitted from at least two BLUETOOTH® devices, the releasing unit 450 may release the connection with the other BLUETOOTH® devices including the second BLUETOOTH® device.

The above descriptions made with reference to FIGS. 2 to 9 may be applied to the first BLUETOOTH® device, and thereby further descriptions is omitted.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A connection method of a first Bluetooth device for a Bluetooth communication between the first Bluetooth device and a second Bluetooth device, the connection method comprising:

transmitting a public key of the first Bluetooth device to the second Bluetooth device via a predefined single Bluetooth channel;
determining whether a response to the public key of the first Bluetooth device is transmitted from at least two Bluetooth devices including the second Bluetooth device, without successfully receiving the response transmitted from the second Bluetooth device; and
releasing a connection with one or more Bluetooth devices including the second Bluetooth device, in response to determining that a response was transmitted from at least two Bluetooth devices.

2. The connection method of claim 1, wherein the transmitting of the public key of the first Bluetooth device further comprises transmitting an address of the first Bluetooth device together with the public key of the first Bluetooth device.

3. The connection method of claim 1, wherein the determining comprises determining whether the response to the public key of the first Bluetooth device is transmitted from the at least two Bluetooth devices based on whether interference occurs in the response to the public key of the first Bluetooth device.

4. The connection method of claim 1, wherein the determining comprises receiving the response to the public key of the first Bluetooth device via the predefined single Bluetooth channel.

5. The connection method of claim 1, wherein, if the response to the public key of the first Bluetooth device is determined to be transmitted from a single Bluetooth device, the connection method further comprises:
obtaining the public key of the single Bluetooth device from the single Bluetooth device; and
transmitting, to the single Bluetooth device, a response to the public key of the single Bluetooth device.

6. The connection method of claim 5, wherein the transmitting of the response to the public key of the single Bluetooth device further comprises transmitting the response to the public key of the single Bluetooth device via the predefined single Bluetooth channel.

7. The connection method of claim 1, further comprising:
selecting one of a multi-channel mode for sequentially transmitting the public key of the first Bluetooth device using a plurality of available Bluetooth channels, and a One Channel Mode (OCM) for transmitting the public key of the first Bluetooth device via the predefined Bluetooth channel from among the plurality of available Bluetooth channels,
wherein the transmitting further comprises transmitting the public key of the first Bluetooth device to the second Bluetooth device via the predefined single Bluetooth channel when the OCM is selected.

8. The connection method of claim 1, further comprising: transmitting synchronization information of the first Bluetooth device or receiving synchronization information of the second Bluetooth device.

9. A connection method of a second Bluetooth device for a Bluetooth communication between the first Bluetooth device and the second Bluetooth device, the connection method comprising:
receiving a public key of the first Bluetooth device from the first Bluetooth device via a predefined single Bluetooth channel;
transmitting a response to the public key of the first Bluetooth device to the first Bluetooth device;
transmitting a public key of the second Bluetooth device to the first Bluetooth device;
determining whether a response to the public key of the second Bluetooth device is transmitted from at least two Bluetooth devices including the first Bluetooth device without successfully receiving the response transmitted from the first Bluetooth device; and
releasing a connection with other Bluetooth devices including the first Bluetooth device, in response to determining that a response to the public key of the second Bluetooth device is transmitted from the at least two Bluetooth devices.

10. The connection method of claim 9, wherein the first Bluetooth device determines whether the response to the public key of the first Bluetooth device is transmitted from at least two Bluetooth devices, and determines whether to transmit the response to the public key of the second Bluetooth device to the second Bluetooth device based on the determined result.

11. The connection method of claim 9, wherein the releasing comprises releasing the connection with the other Bluetooth devices including the first Bluetooth device, in response to determining that the response to the public key of the second Bluetooth is not received for a predetermined period of time.

12. The connection method of claim 9, wherein the releasing comprises releasing the connection with the other Bluetooth devices including the first Bluetooth device based on whether interference occurs in the response to the public key of the second Bluetooth device.

13. A first Bluetooth device that performs a connection for a Bluetooth communication between the first Bluetooth device and a second Bluetooth device, the first Bluetooth device comprising:
a transmission unit to transmit a public key of the first Bluetooth device to the second Bluetooth device via a predefined single Bluetooth channel;
a determination unit to determine whether a response to the public key of the first Bluetooth device is transmitted from at least two Bluetooth devices including the second Bluetooth device, without successfully receiving the response transmitted from the second Bluetooth device; and
a releasing unit to release a connection with other Bluetooth devices including the second Bluetooth device, if the determination unit determines a response was received from at least two Bluetooth devices.

14. The first Bluetooth device of claim 13, wherein the transmission unit further transmits an address of the first Bluetooth device together with the public key of the first Bluetooth device.

15. The first Bluetooth device of claim 13, wherein the determination unit determines whether the response to the public key of the first Bluetooth device is transmitted from the at least two Bluetooth devices based on whether interference occurs in the response to the public key of the first Bluetooth device.

16. The first Bluetooth device of claim 13, further comprising:
a receiving unit to receive the response to the public key of the first Bluetooth device via the predefined single Bluetooth channel.

17. The first Bluetooth device of claim 13, further comprising:
a mode determination unit to select one of a multi-channel mode for sequentially transmitting the public key of the first Bluetooth device using a plurality of available Bluetooth channels, and an OCM for transmitting the public key of the first Bluetooth device via the predefined single Bluetooth channel from among the plurality of available Bluetooth channels, wherein the transmission unit transmits the public key of the first Bluetooth device to the second Bluetooth device via the predefined single Bluetooth channel when the mode determination unit selects the OCM.

18. The first Bluetooth device of claim 13, wherein, if the response to the public key of the first Bluetooth device is determined to be transmitted from a single Bluetooth device, the transmission unit transmits the response to the public key of the single Bluetooth device to the single Bluetooth device.

19. The first Bluetooth device of claim 18, wherein the transmission unit transmits the response to the public key of the single Bluetooth device to the single Bluetooth device via the predefined single Bluetooth channel.

20. A connection method of a first Bluetooth device for a Bluetooth communication between the first Bluetooth device and a second Bluetooth device, the connection method comprising:

selecting one of a multi-channel mode for sequentially transmitting a public key of the first Bluetooth device using a plurality of available Bluetooth channels, and a One Channel Mode (OCM) for transmitting the public key of the first Bluetooth device via a predefined Bluetooth channel from among the plurality of available Bluetooth channels, transmitting the public key of the first Bluetooth device to the second Bluetooth device via the predefined single Bluetooth channel when the OCM is selected, determining whether a response to the public key of the first Bluetooth device is transmitted from at least two Bluetooth devices including the second Bluetooth device; and releasing a connection with one or more Bluetooth devices including the second Bluetooth device, in response to determining that a response was transmitted from at least two Bluetooth devices.

21. The connection method of claim 20, wherein the transmitting of the public key of the first Bluetooth device further comprises transmitting an address of the first Bluetooth device together with the public key of the first Bluetooth device.

22. The connection method of claim 20, wherein the determining comprises determining whether the response to the public key of the first Bluetooth device is transmitted from the at least two Bluetooth devices based on whether interference occurs in the response to the public key of the first Bluetooth device.

23. The connection method of claim 20, wherein the determining comprises receiving the response to the public key of the first Bluetooth device via the predefined single Bluetooth channel.

* * * * *